(12) United States Patent
Williamson

(10) Patent No.: US 7,343,481 B2
(45) Date of Patent: Mar. 11, 2008

(54) BRANCH PREDICTION IN A DATA PROCESSING SYSTEM UTILIZING A CACHE OF PREVIOUS STATIC PREDICTIONS

(75) Inventor: David James Williamson, Austin, TX (US)

(73) Assignee: ARM Limited, Cambridge (GB)

( * ) Notice: Subject to any disclaimer, the term of this patent is extended or adjusted under 35 U.S.C. 154(b) by 690 days.

(21) Appl. No.: 10/391,186

(22) Filed: Mar. 19, 2003

(65) Prior Publication Data

US 2004/0186984 A1    Sep. 23, 2004

(51) Int. Cl.
*G06F 9/38*   (2006.01)

(52) U.S. Cl. .................. 712/238; 712/207; 712/239; 711/213

(58) Field of Classification Search ............... 712/207, 712/233, 237–240; 711/213
See application file for complete search history.

(56) References Cited

U.S. PATENT DOCUMENTS

| | | | | |
|---|---|---|---|---|
| 5,553,253 A * | 9/1996 | Pan et al. | ..... | 712/240 |
| 5,553,255 A * | 9/1996 | Jain et al. | ..... | 712/235 |
| 5,740,418 A * | 4/1998 | Hara | ..... | 712/239 |
| 5,815,699 A * | 9/1998 | Puziol et al. | ..... | 712/240 |
| 5,978,909 A * | 11/1999 | Lempel | ..... | 712/240 |
| 6,427,206 B1 * | 7/2002 | Yeh et al. | ..... | 712/239 |

* cited by examiner

*Primary Examiner*—Tonia L. Meonske
(74) *Attorney, Agent, or Firm*—Nixon & Vanderhye P.C.

(57) ABSTRACT

A data processing system incorporates an instruction prefetch unit 8 including a static branch predictor 12. A static branch prediction cache 30, 32, 34 is provided for storing a most recently encountered static branch prediction such that a subsequent request to fetch the already encountered branch instruction can be identified before the opcode for that branch instruction is returned. The cached static branch prediction can thus redirect the prefetching to the branch target address sooner than the static predictor 12.

16 Claims, 3 Drawing Sheets

Prefetched Instruction Stream

X   X  Branch opcode identified (i)   A  B  C  Branch  D  E  A  B  C....

Branch address identified (ii)  A  B  C  Branch  A  B  C ....

BRANCH PREDICTION IN A DATA PROCESSING SYSTEM UTILIZING A CACHE OF PREVIOUS STATIC PREDICTIONS

BACKGROUND OF THE INVENTION

1. Field of the Invention

This invention relates to data processing systems. More particularly, this invention relates to branch prediction within data processing systems.

2. Description of the Prior Art

It is known to provide data processing systems which incorporate branch prediction mechanisms. High performance data processors typically include a mechanism to prefetch program instructions from memory in advance of those program instructions being required for execution by the processor. Once a given program instruction is executed it is normal to proceed to execute the program instruction at the immediately following memory address location unless a branch instruction has occurred redirecting the program flow to a different point. Thus, a simple prefetch mechanism may prefetch instructions from a sequence of immediately adjacent memory address locations. However, if a branch instruction is encountered causing a jump away from this normal sequence, then the prefetching that has taken place will have been incorrect and there will be a time penalty incurred as the next required instruction is fetched from the memory. To address this problem branch prediction mechanisms are known to be provided.

Broadly speaking, branch prediction mechanisms seek to identify branch instructions occurring within the program flow and modify the behaviour of the instruction prefetching mechanisms based upon a prediction as to whether or not the branch instruction concerned will or will not result in a jump away from the normal sequence of program instruction addresses.

One type of branch prediction mechanism is termed static branch prediction whereby a branch instruction is identified by the opcode for a branch instruction being returned from the memory and then a rule applied to predict whether or not that branch instruction will result in a jump. One rule is that branch instructions specifying a backward jump in the program flow are predicted to be taken whereas branch instructions indicating a forward jump are predicted not to be taken. Static branch prediction has the advantage of being relatively simple to implement, but the disadvantages that it is not until the opcode is returned for the branch instruction that the branch instruction is identified as such and so some incorrect further prefetches may have already been initiated as well as the limitation to the fixed rule for making a prediction which is non-responsive to actual observed behaviour.

Another type of branch prediction can be based upon historical activity. As an example, such predictors may seek to identify patterns arising in the execution of the code such as every third branch being taken. Whilst such branch prediction mechanisms may produce more accurate predictions than static branch prediction mechanisms, they suffer from the disadvantage of being more complex and consuming more circuit resource.

Another known type of branch prediction mechanism utilises a branch target address cache (BTAC) which stores a plurality of branch instruction addresses each associated with their target instruction addressees and data indicating the likelihood of that branch being taken, e.g. strongly predicted, weakly predicted, weakly non-predicted and strongly non-predicted. The data specifying the prediction associated with each branch is dynamically updated based upon the result of the associated branch instruction when it is actually executed. BTAC mechanisms can be responsive to the attempted prefetching from a memory address from which a branch address has previously been fetched and the target address and result cached such that the prefetching address sequence can be modified before the actual branch instruction opcode is returned from the memory in a way that would enable it to be recognised by a static branch prediction mechanism as discussed above. Whilst BTAC mechanisms provide good performance advantages, they are disadvantageously complex and require a disadvantageous amount of circuit resource to implement.

Another way of dealing with the occurrence of branch instructions disrupting prefetch behaviour is to provide a sufficiently large prefetch instruction buffer together with the ability to fetch instructions from memory at a faster rate than they are consumed from the prefetch buffer by execution. In such systems a branch prediction mechanism which suffers from a delay in identifying a branch instruction until it is actually returned as an opcode, e.g. a static branch predictor as discussed above, may be compensated for in that incorrectly prefetched instructions can be flushed from the prefetch buffer and the prefetch buffer refilled without any interruption in the supply of instructions from the prefetch buffer to the mechanisms for executing the instructions. However, this approach does not address problems associated with tight program loops and also requires significant circuit resource.

SUMMARY OF THE INVENTION

Viewed from one aspect the present invention provides apparatus for processing data under control of a sequence of program instructions stored in a memory, said apparatus comprising:

an instruction prefetch unit coupled to said memory and operable to prefetch from a sequence of prefetch addresses within said memory a sequence of program instructions to be executed;

a static branch predictor operable to detect an opcode of a branch instruction within said sequence of program instructions read from said memory and to perform a static prediction independent of previous processing activity as to whether said branch instruction will result in a jump to a branch target instruction stored at a branch target address within said memory, said instruction prefetch unit being responsive to a prediction by said static branch predictor that said branch instruction will result in said jump to alter said sequence of prefetch addresses to prefetch a sequence of program instructions starting from said branch target address;

a static branch prediction cache triggered by a static prediction by said static branch predictor of a branch instruction that will result in a jump to a target branch address to store said static prediction as a branch instruction address of said branch instruction together with said branch target address, said static prediction stored by said static branch prediction cache being unaltered by whether subsequent execution of said branch instruction does result in said jump; and an address comparator operable to compare a prefetch address of a program instruction being prefetched by said prefetch unit from said memory with said branch instruction address stored in said static branch prediction cache and upon a match to alter said sequence of prefetch addresses to prefetch a sequence of program instructions starting from said associated branch target address stored in said static branch prediction cache.

The invention recognises that there are circumstances in which the late identification of branch instructions by a static branch predictor can produce problems that cannot simply be offset by the provision of a large prefetch buffer and a fast instruction prefetching mechanism. In particular, tight program loops can result in the frequency of incorrect instructions being fetched before a branch is identified from its returned opcode being such that the instruction prefetch buffer effectively underflows harming the progress through the program. This is particularly significant as tight program loops are often found in performance critical code. As well as identifying this problem, the invention proposes a solution which is hardware efficient compared to providing an historically based prediction mechanism or a BTAC. In particular, the invention recognises that caching previous static predictions which resulted in jumps has the result that a tight program loop which is repeatedly executed will only rely upon purely the static branch prediction on its first pass and thereafter will utilise the cached static prediction result which is available more rapidly and so avoid the delay associated with the static branch predictor. The subsequent occurrences of the branch instruction can be recognised by the attempt to prefetch from their branch instruction address and the target address read from the cached static prediction to immediately redirect the prefetching to the point previously identified when the branch instruction was first encountered. Advantageously little hardware is required to add this static branch prediction caching and the mechanisms for using it and yet a worthwhile performance gain can be achieved, particularly in the context of what may be performance critical tight program loops.

Preferred forms of the invention utilise a static branch predictor which predicts a jump if the branch target is a backward jump and does not predict a jump if the branch target is a forward jump. This matches the characteristics of tight program loops which are often performance critical.

Since the static branch prediction cache and associated comparison mechanisms serve to redirect the prefetching address before the static branch predictor is able to identify the branch instruction, preferred embodiments of the invention act to suppress any subsequent alteration attempted by the static branch predictor when the branch has already been identified and for which a modification in the prefetch address sequence has already been made.

Whilst it is possible that the static branch prediction cache could store multiple static branch predictions, the greatest part of the benefit can be achieved by storing a single static branch prediction result and the hardware overhead accordingly reduced. The static branch prediction best stored is the most recent static branch prediction.

In order to deal with power up and other circumstances in which the correctness of the data held in the static branch prediction is not assured, preferred embodiments of the invention provide a valid flag within the static branch prediction cache indicative of whether or not valid data is currently stored therein. In preferred embodiments such a valid flag is utilised to indicate invalidity upon the circumstances such as a change in memory address mapping and/or a context switch.

Viewed from another aspect the present invention provides a method of processing data under control of a sequence of program instructions stored in a memory, said method comprising the steps of:

prefetching from a sequence of prefetch addresses within said memory a sequence of program instructions to be executed;

detecting an opcode of a branch instruction within said sequence of program instructions read from said memory and performing a static prediction independent of previous processing activity as to whether said branch instruction will result in a jump to a branch target instruction stored at a branch target address within said memory, said prefetching being responsive to a prediction that said branch instruction will result in said jump to alter said sequence of prefetch addresses to prefetch a sequence of program instructions starting from said branch target address;

triggered by a static prediction of a branch instruction that will result in a jump to a target branch address, storing in a static branch prediction cache said static prediction as a branch instruction address of said branch instruction together with said branch target address, said static prediction stored by said static branch prediction cache being unaltered by whether subsequent execution of said branch instruction does result in said jump; and comparing a prefetch address of a program instruction being prefetched from said memory with said branch instruction address stored in said static branch prediction cache and upon a match altering said sequence of prefetch addresses to prefetch a sequence of program instructions starting from said associated branch target address stored in said static branch prediction cache.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
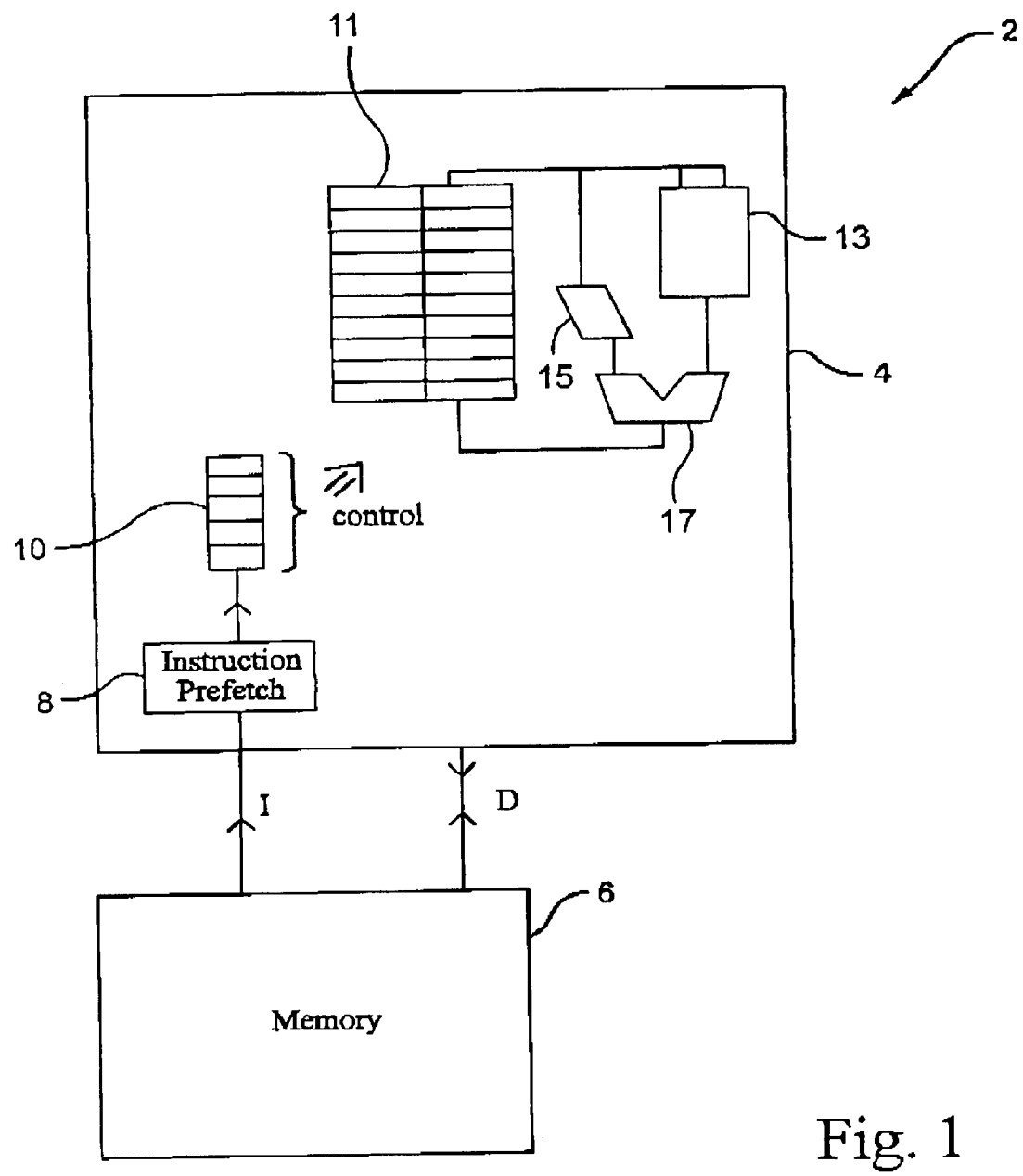
FIG. 1 schematically illustrates a processor core coupled to a memory.

FIG. 1 schematically illustrates a data processing system 2 including a processor core 4 coupled to a memory 6. The memory 6 stores instruction words and data words. The instruction words are prefetched by an instruction prefetch unit 8, which includes an instruction prefetch buffer, e.g. a four instruction word prefetch buffer although other buffer sizes are also possible. Instruction words are fed from the instruction prefetch unit 8 to an instruction pipeline 10 where they are used to control the processing operations performed by the other elements of the processor core 4, such as the register bank 11, the multiplier 13, the shifter 15 and the adder 17.

It will be appreciated that the system illustrated in FIG. 1 would typically include many more components which are not shown. However, FIG. 1 illustrates the use of an instruction prefetch unit 8 between the memory 6 and the instruction pipeline 10. Such an instruction prefetch unit 8 can advantageously include branch prediction mechanisms.

Figure 2:
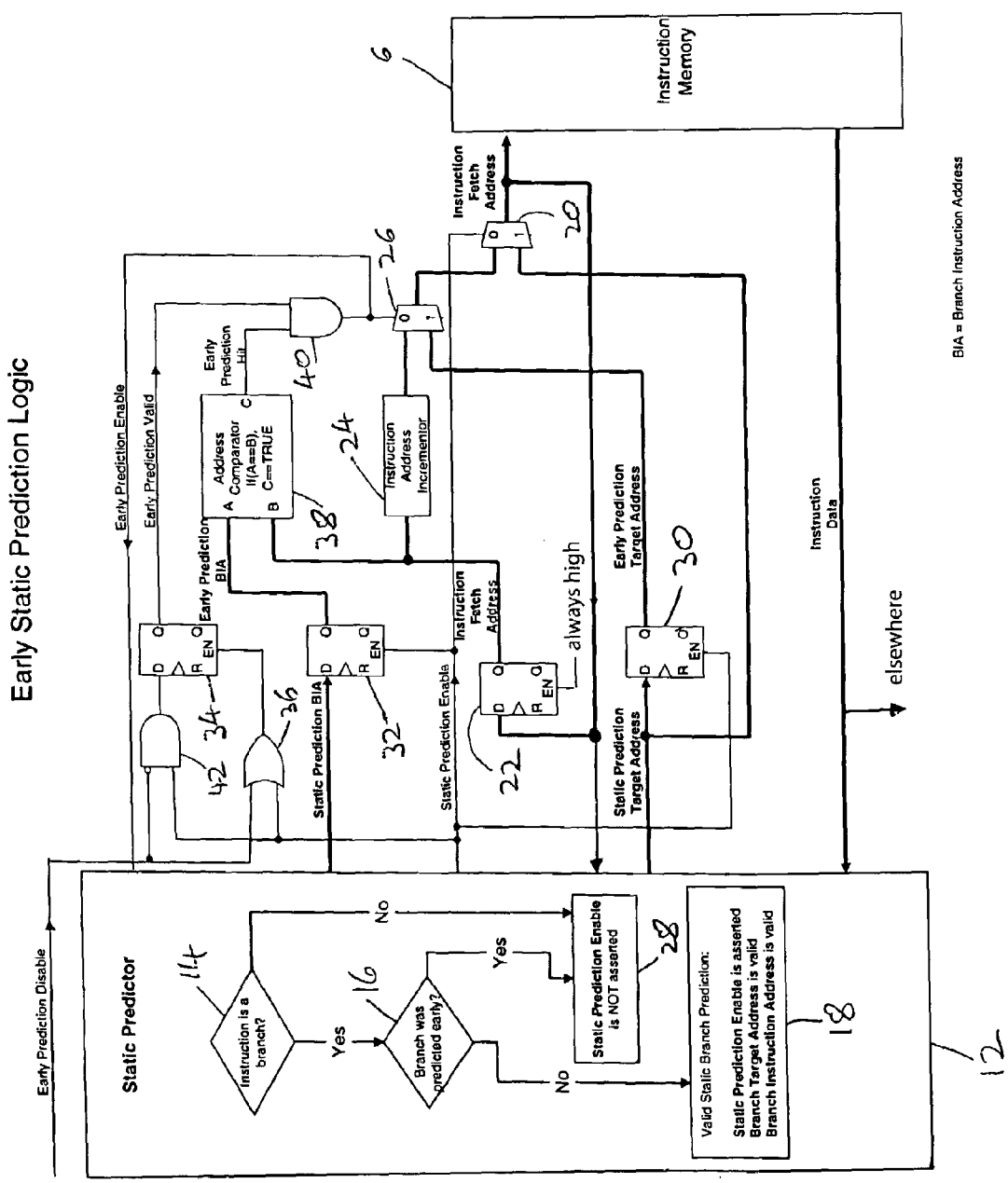
FIG. 2 schematically illustrates branch prediction mechanisms for utilisation in conjunction with instruction prefetching.

FIG. 2 schematically illustrates branch prediction mechanisms which can be included within the instruction prefetch unit 8. A static predictor 12 can be provided which serves to provide a modified form of static branch prediction. More particularly, the static predictor 12 receives the instruction data and so will receive branch instruction opcodes which can be identified as such. This is indicated by step 14 within the schematically illustrated control flow of the static predictor 12. When such a branch instruction opcode is identified, then a check is made as to whether or not that branch has already been identified and predicted for by the early static prediction mechanisms which will be described later. This is illustrated at step 16. If the branch has not already been identified as such, then step 18 illustrates normal static branch prediction behaviour in that the branch target address is read from the branch instruction and driven out so as to specify the next instruction fetch address via multiplexer 20 which is switched by the static prediction enable signal. The instruction fetch address is latched at every fetch cycle within the register 22 such that sequentially following instruction addresses may be generated when branches are not identified using the instruction address incrementor 24 whose output may be selected for use via the multiplexer 26 and the multiplexer 20 when the static prediction enable signal and an early prediction enable signal so direct.

Returning to the static predictor 12, if either the step 14 indicates that the instruction opcode returned is not a branch or step 16 indicates that that branch has already been predicted, then step 28 serves to take no action upon that instruction opcode.

It will be appreciated that the control flow illustrated by the flow diagram inside the static predictor 12 of FIG. 2 will in practice normally be provided by hardwired logic.

In addition to the static predictor 12, the circuit illustrated in FIG. 2 also provides early static prediction logic including a prediction target address register 30, a branch instruction address register 32 and a valid flag register 34. The static prediction target address register 30, the branch instruction address register 32 and the valid flag register 34 can together be considered to form part of a static branch prediction cache storing a most recently encountered static branch prediction in terms of its target address, its branch instruction address and its validity. When the static predictor 12 first encounters a branch instruction for which it is to make a prediction, i.e. a backwards jump branch as opposed to forward jump branches, which in this example embodiment will be ignored, the static prediction enable signal controls the static prediction target address register 30 to store the branch target address, the branch instruction register 32 to store the branch instruction address and via the OR gate 36 the valid flag register 34 to store a flag indicating the static prediction is valid. If the branch instruction corresponding to that cached static prediction is encountered again, then its instruction address is already stored within the instruction fetch register 22 and a comparator 38 will compare this with the stored branch instruction address within the branch instruction address register 32 and indicate a match which causes the early prediction hit signal at output C to be asserted as true. Providing the valid flag register 34 indicates that the cached static prediction is a valid one, then the AND gate 40 will pass this early prediction hit signal to the multiplexer 26 and cause this to select the cached target address from the static prediction target address register 30 to be output as the next instruction fetch address via multiplexer 20 as well as being fed back to the instruction fetch address register 22 so that the sequence of instruction fetch addresses can follow on from the target address.

An early prediction disable signal provides one input to the OR gate 36 as well as an input to an AND gate 40 which together force the valid flag register 34 to store a flag indicating invalidity of the cached static prediction when the early prediction disable signal is asserted. The early prediction disable signal can be asserted in various circumstances, such as when a memory address mapping change occurs, a context switch occurs or as a consequence of system configuration data that may be stored within control registers. At an overall level, it will be appreciated that the early static prediction logic illustrated in FIG. 2 includes a static branch prediction cache and an address comparitor which represent comparatively little additional circuit overhead and yet serve to identify an already encountered branch instruction from its instruction address rather than its opcode in a way that enables the prefetch address sequence to be redirected more rapidly.

Figure 3:
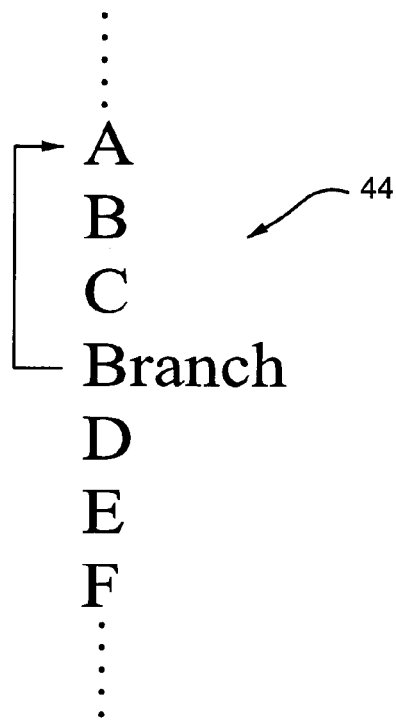
FIG. 3 schematically illustrates a sequence of instructions to be executed and corresponding possible prefetched instruction streams.

FIG. 3 schematically illustrates a sequence of program instructions 44 incorporating a relatively tight program loop. The instruction prefetch unit 8 of FIG. 1 will attempt to prefetch program instructions in a manner that anticipates the program flow which will occur. Possible prefetched instruction streams are illustrated as stream (i) and stream (ii). The instruction stream (i) illustrates the sequence of prefetched instructions that occur when the branch instruction is first encountered. A fetch of a branch instruction may be initiated multiple cycles before the instruction is actually returned. Accordingly, as the branch instruction cannot be identified on the first pass other than from its opcode, sequentially following instructions D and E will already have been ordered to be fetched before the branch instruction is identified and the fetching can be redirected to instruction A. The incorrectly prefetched instructions D and E can be marked as invalid and flushed from an instruction prefetch buffer. However, if the loop is tight and the rate at which instructions can be prefetched is not high, then the repeated incorrect prefetching of instructions can cause an underflow in the instruction prefetch buffer.

Stream (ii) illustrate the sequence of program instructions prefetched utilising the early static prediction logic caching a previously generated static branch prediction for the branch instruction. In this case, when the branch instruction is triggered to be fetched by the issue of its instruction address, this instruction address can be identified as corresponding to the previously encountered static branch prediction and accordingly the target address associated with that cached static branch prediction immediately used to redirect prefetching to instruction A.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data under control of a sequence of program instructions stored in a memory, said apparatus comprising:
   an instruction prefetch unit, coupled to said memory, for prefetching, from a sequence of prefetch addresses within said memory, a sequence of program instructions to be executed;
   a static branch predictor for detecting an opcode of a branch instruction within said sequence of program instructions read from said memory and for performing a static prediction independent of previous processing activity as to whether said branch instruction will result in a jump to a branch target instruction stored at a branch target address within said memory, said instruction prefetch unit being responsive to a prediction by said static branch predictor that said branch instruction will result in said jump to alter said sequence of prefetch addresses to prefetch a sequence of program instructions starting from said branch target address;

a static branch prediction cache, triggered by a static prediction by said static branch predictor of a branch instruction that will result in a jump to a target branch address, for storing said static prediction as a branch instruction address of said branch instruction together with said branch target address, said static prediction stored by said static branch prediction cache being unaltered by whether subsequent execution of said branch instruction does result in said jump; and an address comparitor for comparing a prefetch address of a program instruction being prefetched by said prefetch unit from said memory with said branch instruction address stored in said static branch prediction cache and upon a match to alter said sequence of prefetch addresses to prefetch a sequence of program instructions starting from said associated branch target address stored in said static branch prediction cache.

2. Apparatus as claimed in claim 1, wherein said static branch predictor predicts that a branch instruction will result in a jump if said branch target address would result in a backward jump in program execution flow.

3. Apparatus as claimed in claim 1, wherein said static branch predictor predicts that a branch instruction will not result in a jump if said branch target address would result in a forward jump in program execution flow.

4. Apparatus as claimed in claim 1, wherein when said address comparitor triggers an alteration in said sequence of prefetch addresses associated with a branch instruction, subsequent alteration of said sequence of prefetch addresses by said static branch predictor based upon detection of said opcode for said branch instruction is suppressed.

5. Apparatus as claimed in claim 1, wherein said static branch prediction cache is operable to store a single static branch prediction.

6. Apparatus as claimed in claim 5, wherein said static branch prediction cache is operable to store a most recent static branch prediction.

7. Apparatus as claimed in claim 1, wherein said static branch prediction cache is operable to store a valid flag indicative of whether said static branch prediction cache is storing a valid said static branch prediction.

8. Apparatus as claimed in claim 7, wherein said valid flag is written to indicate invalidity upon one or more of:
a change in memory address mapping; and
a context switch.

9. A method of processing data under control of a sequence of program instructions stored in a memory, said method comprising the steps of:

prefetching, from a sequence of prefetch addresses within said memory, a sequence of program instructions to be executed;

detecting an opcode of a branch instruction within said sequence of program instructions read from said memory and performing a static prediction, independent of previous processing activity, as to whether said branch instruction will result in a jump to a branch target instruction stored at a branch target address within said memory, said prefetching step being responsive to a prediction that said branch instruction will result in said jump to alter said sequence of prefetch addresses to prefetch a sequence of program instructions starting from said branch target address;

triggered by a static prediction of a branch instruction that will result in a jump to a target branch address, storing in a static branch prediction cache said static prediction as a branch instruction address of said branch instruction together with said branch target address, said static prediction stored by said static branch prediction cache being unaltered by whether subsequent execution of said branch instruction does result in said jump; and comparing a prefetch address of a program instruction being prefetched from said memory with said branch instruction address stored in said static branch prediction cache and, upon a match, altering said sequence of prefetch addresses to prefetch a sequence of program instructions starting from said associated branch target address stored in said static branch prediction cache.

10. A method as claimed in claim 9, wherein said step of performing a static prediction predicts that a branch instruction will result in a jump if said branch target address would result in a backward jump in program execution flow.

11. A method as claimed in claim 9, wherein said step of performing a static prediction predicts that a branch instruction will not result in a jump if said branch target address would result in a forward jump in program execution flow.

12. A method as claimed in claim 9, wherein said step of comparing triggers an alteration in said sequence of prefetch addresses associated with a branch instruction, subsequent alteration of said sequence of prefetch addresses based upon detection of said opcode for said branch instruction is suppressed.

13. A method as claimed in claim 9, wherein said static branch prediction cache is operable to store a single static branch prediction.

14. A method as claimed in claim 13, wherein said static branch prediction cache is operable to store a most recent static branch prediction.

15. A method as claimed in claim 9, wherein said static branch prediction cache is operable to store a valid flag indicative of whether said static branch prediction cache is storing a valid said static branch prediction.

16. A method as claimed in claim 15, wherein said valid flag is written to indicate invalidity upon one or more of:
a change in memory address mapping; and
a context switch.

* * * * *